Oct. 8, 1940.    U. S. BERGER    2,216,730
MEASURING DEVICE
Filed July 8, 1939    5 Sheets-Sheet 3

INVENTOR
U.S. BERGER
BY
John A. Hall
ATTORNEY

Oct. 8, 1940.                    U. S. BERGER                    2,216,730
                                MEASURING DEVICE
                              Filed July 8, 1939                 5 Sheets-Sheet 4

INVENTOR
U. S. BERGER
BY
ATTORNEY

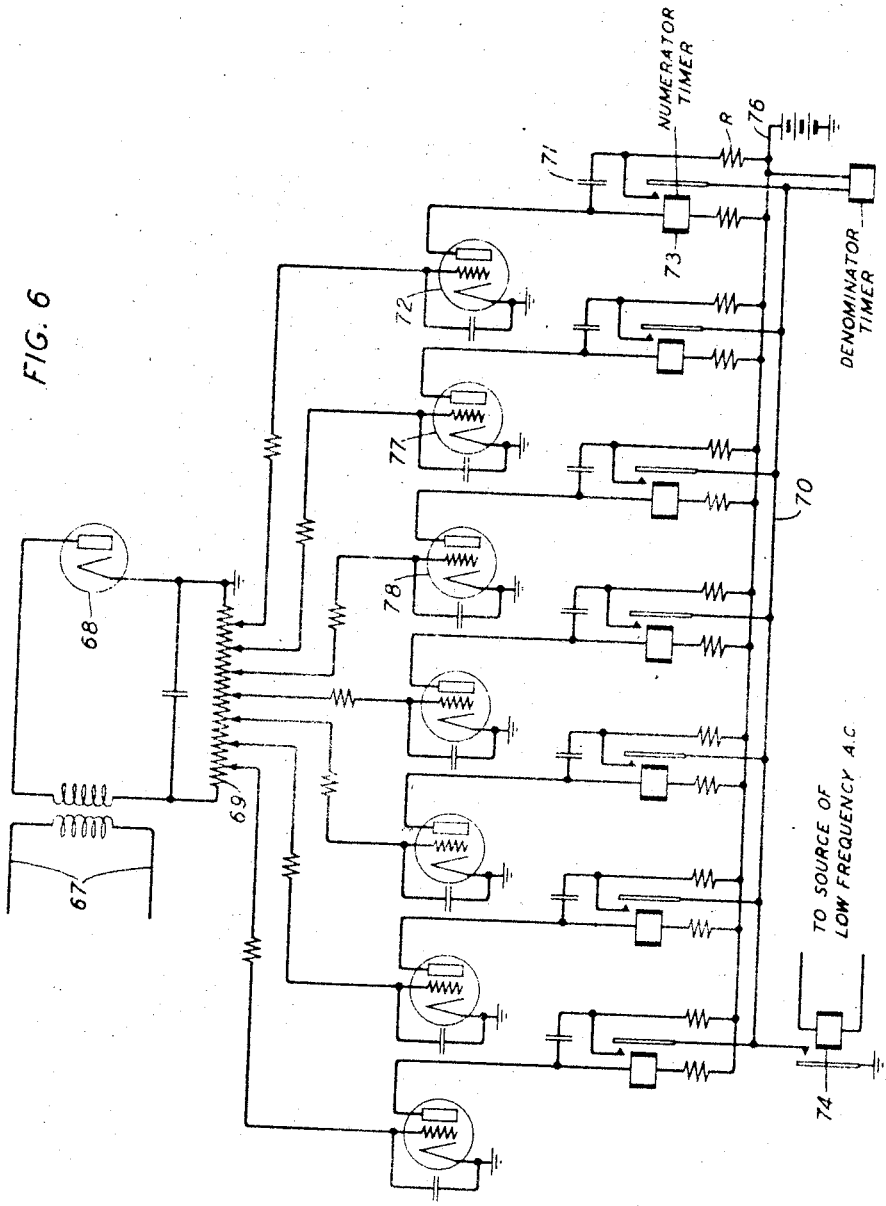

Patented Oct. 8, 1940

2,216,730

UNITED STATES PATENT OFFICE 2,216,730

MEASURING DEVICE

Uriah S. Berger, New York, N. Y., assignor to Bell Telephone Laboratories, Incorporated, New York, N. Y., a corporation of New York Application July 8, 1939, Serial No. 283,366

6 Claims. (Cl. 161—15)

This invention relates to electrical measuring devices and particularly to recording means for observing by numerical count the condition of a transmission channel over a given period of time.

The object of the invention is to determine what percentage of time a transmission channel is in a given condition. Specifically, this invention is useful in determining what percentage of time a radio channel will transmit a given signal at least a given level above the noise level and thus help in determining the usefulness of such a radio channel for a given purpose. Where severe fading takes place and where due to commercial limitations it is only possible to transmit with a given maximum power, this invention has been found useful in determining what type of signal can most successfully be employed.

Essentially the invention comprises a denominator timer, a plurality of numerator timers, and a marginal means responsive to the condition to be observed for controlling said numerator timers. Such a marginal means acts as an indicator causing the operation of all numerator timers below the indication at any time and the non-operation of all numerator timers above such indication. The marginal means is capable of faithfully and rapidly following the variations of the given condition as they occur.

A feature of the present invention is a master or denominator timer and a plurality of numerator timers in the form of electrically driven numerical counters such as those used as message registers in telephone working.

Another feature of the invention is a marginal means in the form of a plurality of differently adjusted electroresponsive devices. In one specific form of the invention such electroresponsive devices are relays. In another specific form of the invention such electroresponsive devices are gas-filled trigger action tubes.

Another feature of the invention is a visual indicating means for showing the state of the condition to be observed at any instant.

The drawings consist of five sheets containing six figures.

Fig. 6 is an alternative form of the invention as shown in Fig. 2. In Fig. 2 marginal relays are shown, but Fig. 6 makes use of gas-filled trigger tubes.

Figure 1:
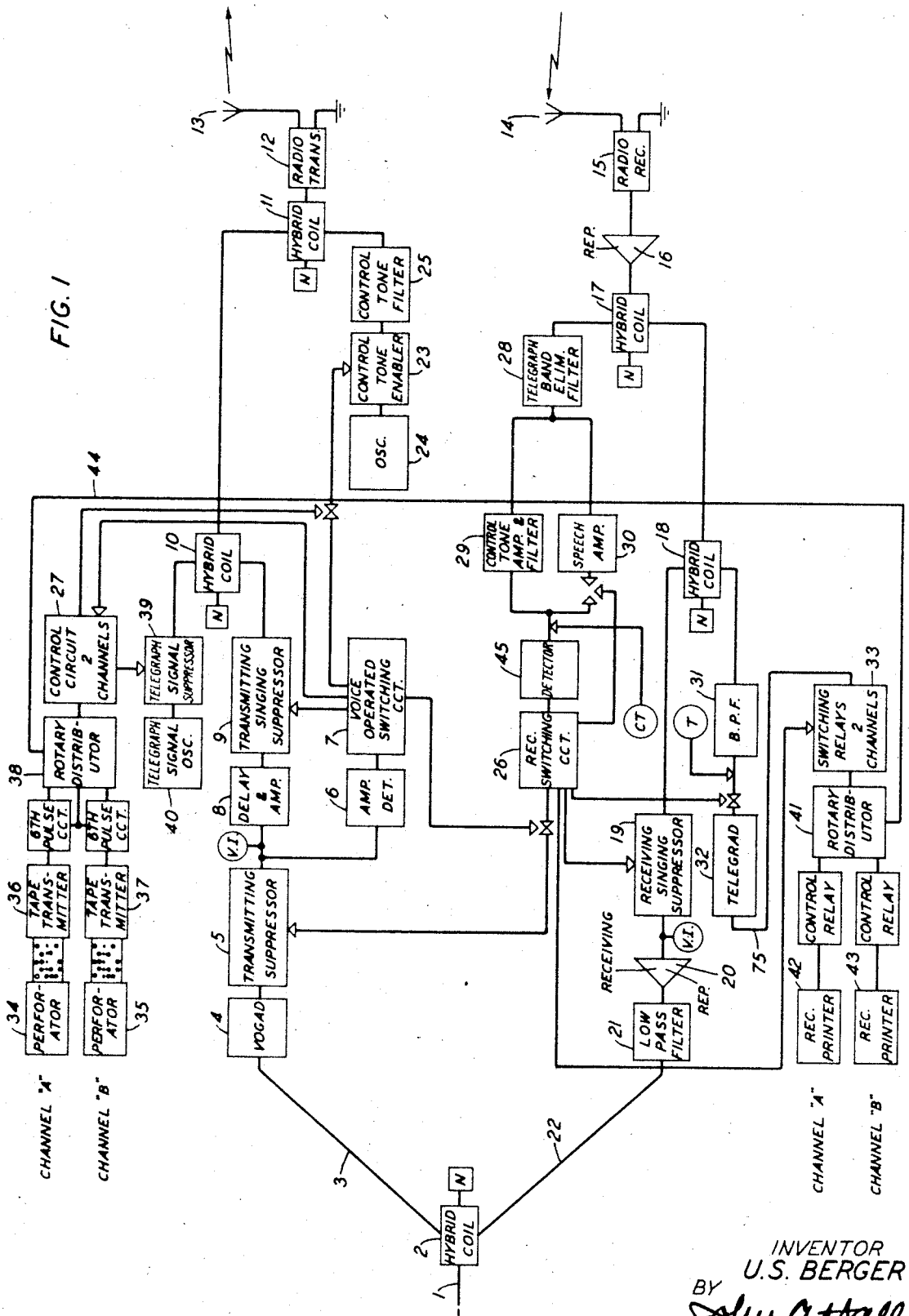
Fig. 1 is a general schematic diagram of an interpolated telephone and telegraph system indicating where the measuring device of the present invention may be connected to the circuit.

A speech path 1 leads to a hybrid coil 2 from which a path 3 for outgoing speech leads to a vogad 4. The outgoing speech then passes through a transmitting suppressor 5 and by means of an amplifier-detector 6 operates a chain of relays 7, here labeled as "voice operated switching circuit." This voice operated switching circuit controls a transmitting singing suppressor 9 so that the outgoing speech can pass from the transmitting suppressor 5 through the delay and amplifier 8 and the transmitting singing suppressor 9 to the hybrid coil 10. From the hybrid coil 10 the speech reaches another hybrid coil 11 and thence goes through the radio transmitter 12 to the transmitting antenna 13. Through radio transmission the speech will be received at some distant point and for purposes of explanation it will be assumed that the distant point has a receiving circuit similar in all respects to the lower part of Fig. 1. The speech therefore enters antenna 14, passes a radio receiver 15 and a vodas repeater to a hybrid coil 17. From the hybrid coil 17 the speech goes into hybrid coil 18, thence through the receiving singing suppressor 19, the receiving repeater 20, low-pass filter 21 and a path 22 to a hybrid coil, such as 2, whence it goes to the receiving subscriber over a line, such as 1.

That part of the circuit between and including the radio transmitter and the radio receiver 15 is spoken of as a mutable link since it comprises a signaling channel capable of or liable to change from internal or external cause which may give rise to interfering energy or more specifically, subject to noise, fading or change of impedance.

The voice operated switching circuit 7 controls a control tone enabler 23 so that a source of control tone 24 is passed through the control tone filter 25 to the hybrid coil 11 and thus enables speech. The voice operated switching circuit 7 also controls a switching point leading from the receiving switching circuit 26 at the same terminal to the transmitting suppressor 5 so as to open this circuit during the periods when speech is going out from line 1 to antenna 13. During this time the voice operated switching circuit 7 also controls the telegraph control circuit 27 to stop the action of the telegraph transmitting circuit.

At the receiving end the control tone coming in over antenna 14 passes through hybrid coil 17 and thence through telegraph band elimination filter 28 and into a control tone amplifier and filter 29 and thence into detector 45. This operates the relays of the receiving switching circuit 26 which performs several functions as follows: First, the circuit 26 controls a normally open circuit between the telegraph band elimination filter 28 and the detector 45 including a speech amplifier 30. This is provided so that when control tone is first received the receiving switching circuit 26 will be operated thereby and then held operated thereafter by speech currents flowing through the amplifier 30. This means that the circuits 29 and 30 are both effective and operate in conjunction with each other to hold the receiving switching circuit chain of relays operated.

The receiving switching circuit 26 also controls the receiving singing suppressor 19 to open up the speech path. The receiving switching circuit 26 also controls a normally closed path between the band-pass filters 21 and 46 and the telegrad 32 so that while speech is being received the telegrad 32 will be disabled. At the same time the receiving switching circuit 26 controls the switching relays for two telegraph channels 33.

During pauses in speech, either when the subscriber at the distant end is talking into channel 1 or during the time when the subscriber or channel 1 pauses during his talking out over the antenna 13, the telegraph apparatus shown in the upper part of the figure is in operation. This comprises perforators 34 and 35, working respectively into tape transmitters 36 and 37 and thence into rotary distributor 38. Rotary distributor 38 works into the control circuit 27 which in turn exercises control over the telegraph signal suppressor 39. A source of telegraph signal tone is supplied to the telegraph signal oscillator 40 and through the action of the telegraph signal suppressor 39 under control of the control circuit sends telegraph signals into the hybrid coil 10, thence through the hybrid coil 11 and out over the radio transmitter 12.

At the distant end these telegraph signals in the form of spurts of alternating current are received over antenna 14 and radio receiver 15 and thence pass through the hybrid coils 17 and 18 to the band-pass filter 31. Thereafter the signals enter the telegrad 32 and are converted from varying strength alternating current signals to uniform strength direct current signals of practically the same length at which they were received over the antenna 14.

The direct current signals produced by the telegrad 32 pass over path 75 to the switching relays 33, thence through the rotary distributor 41 to the two printers 42 and 43. During the reception of telegraph signals the receiving switching circuit 26 is unoperated and the speech path is blocked off by the receiving singing suppressor 19.

Line 44 schematically represents the means for keeping the rotary distributor 38 in exact synchronism with the distant rotary distributor 41. The rotary distributor 38 and the rotary distributor 41 at the same terminal may or may not be kept in synchronism. In actual practice they generally are kept in synchronism for reasons having to do with the cost of synchronizing apparatus but from an operating standpoint it is only necessary that the rotary distributor forming part of the same channel be kept in synchronism.

In Fig. 1 there is a circle with a letter T drawn therein with an arrow pointing to the path between the band-pass filter 31 and telegrad 32. This is an indication of a point to which the measuring device, subject of the present invention, may be connected. Likewise another circle with the letters TC drawn therein with an arrowhead pointing to the circuit between the control tone amplifier and filter 29 and the detector 45, is an indication of another point to which the measuring device may be connected. In the first case, the telegraph tone from the telegraph signal oscillator 40 may be measured as it is varied by the action of the mutable link between the radio transmitter 12 and the radio receiver 15. In the second case, the control tone from the oscillator 24 may be measured as it is effected by the operation of the mutable link. In making these measurements, the system is shut down from normal operation and if the telegraph tone is to be measured then the circuit is temporarily arranged so that telegraph tone will go out over the antenna 13 continuously for the length of time allotted for the test. In the same manner the circuit may be temporarily arranged so that the oscillator 24 sends out control tone over the antenna 13 for the duration of the test. At the distant end the measuring device is connected to the circuit at one of the points indicated.

Figure 4:
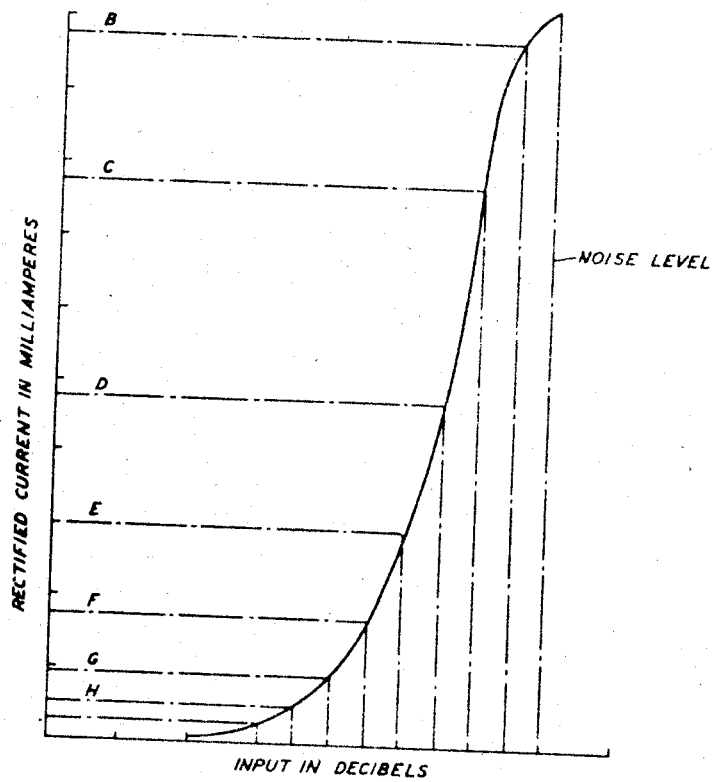
Fig. 4 is a graph plotted between rectified current in milliamperes against input in decibels; in other words, this is a curve plotted between the input and the output of the amplifier-detector of Fig. 2.

The measuring device consists essentially of a pair of input terminals 50 leading through amplifier tubes 51 and 52 to a rectifier device consisting of four copper-oxide rectifiers 53, 54, 55 and 56 connected in a bridge circuit. The alternate vertices of the bridge connect to seven marginal relays in series designated B to H, inclusive. Each of these relays is differently adjusted as indicated in Fig. 4. Fig. 4 is a graph showing the rectified current coming from the copper-oxide bridge plotted against the input at the terminals 50 and since all of these relays may be accurately adjusted to operate and release within a very narrow margin they may be adjusted as indicated by this curve so that relay B, for instance, operates and releases at 5 decibels above noise level, relay C operates and releases at approximately 10 decibels above noise level, D operates and releases at approximately 15 decibels above noise level, etc.

Figure 3:
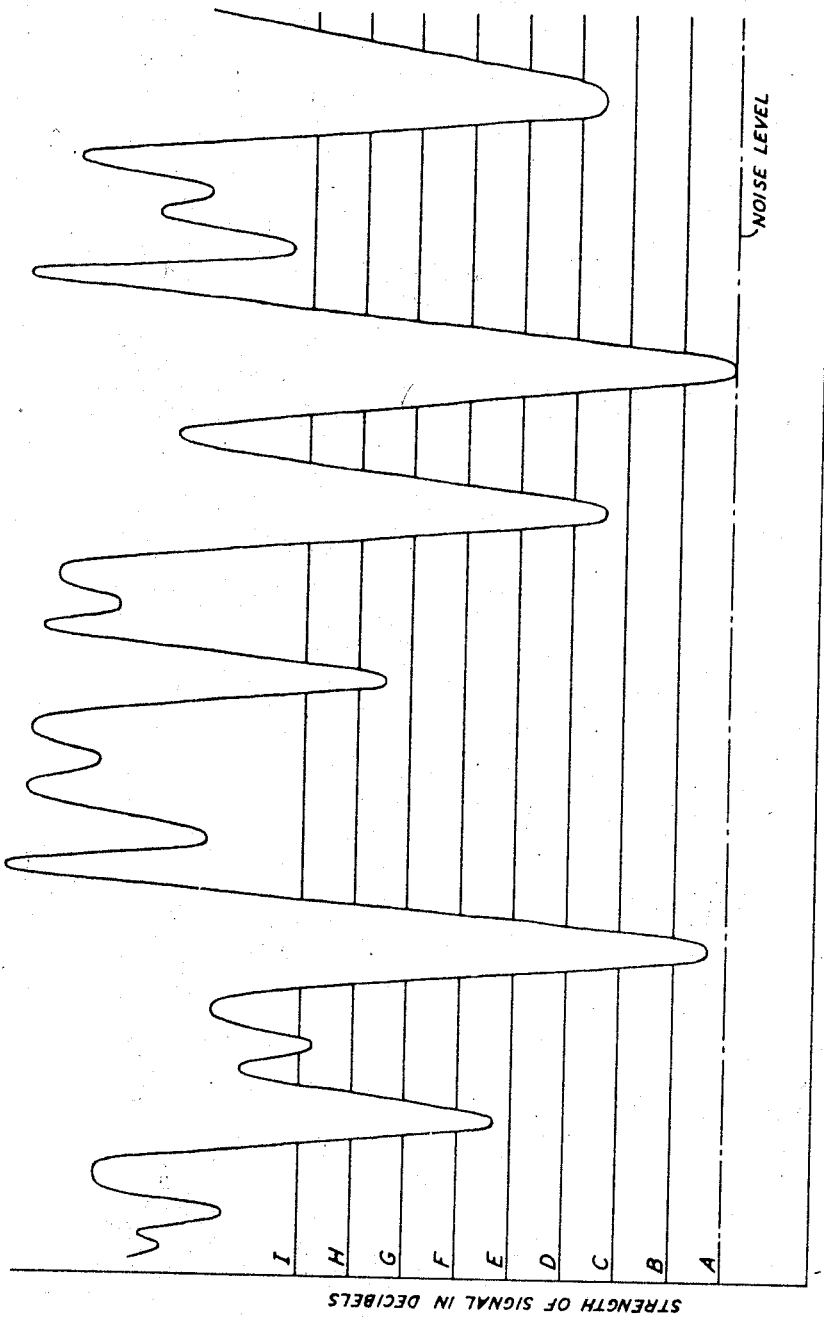
Fig. 3 is a chart indicating by coordinate means how the strength of a signal may vary in relation to time when such signal is transmitted over a mutable link.

With the relays so adjusted reference should be made to Fig. 3. This is an indication of signal variation over a mutable link. The wavy line indicates the actual variation in the strength of the signal which, of course, might be measured by an oscillograph or some sensitive instrument. However, for practical purposes and to avoid the later interpretation of such a curve, the relays B to H, inclusive, are connected in the circuit as explained and will be operated during the time that their lines in Fig. 3 are shown as heavy lines.

Figure 2:
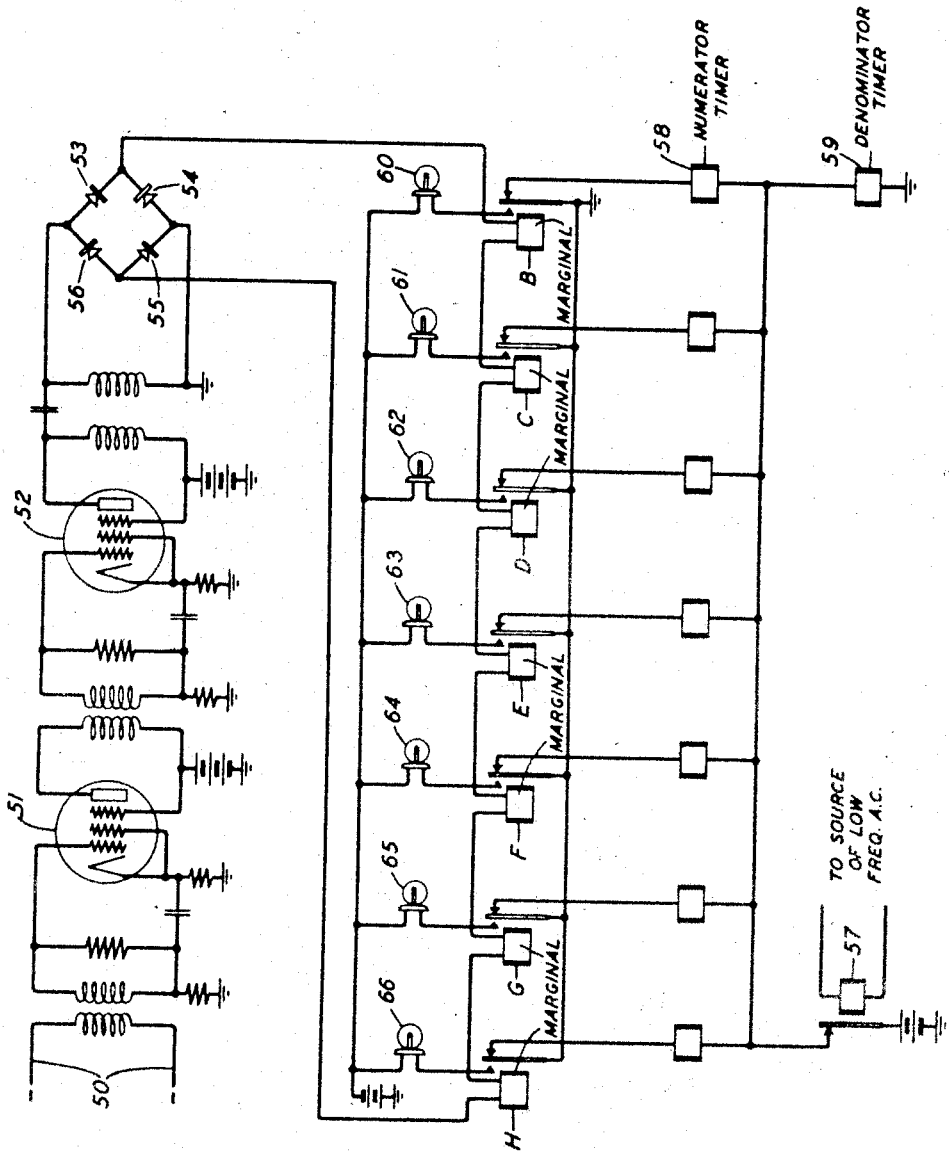
Fig. 2 is a circuit diagram of the measuring device of the present invention.

Connected to the back contact of each of these relays in Fig. 2 there is what may be termed a numerator timer. This may be of any nature which will give an indication of the length of time they have been in operation. For instance, these may be in the form of ordinary telephone-type message registers and may be connected in a circuit from an armature of a relay 57 which is caused to vibrate by a source of alternating current, for example, of 5 cycles per second. Thus if relay B, for instance, rests on its back contact for one second, the numerator timer will be caused to register a count of 5. A denominator timer 59 is connected to the back contact of relay 57 and hence operates continuously over the length of time that the measuring device is in service.

Figure 5:
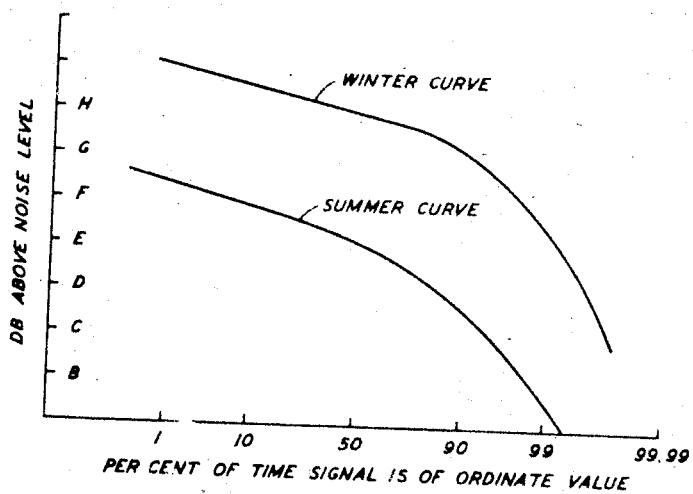
Fig. 5 shows a pair of graphs plotted between decibels above noise level and percentage of time of the signals of ordinate value; one graph indicates data obtained during the winter and another graph indicates data obtained during the summer.

At the end of a period of service the readings of the denominator timer 59 and the numerator timer, such as 58, are taken and through a simple arithmetical operation the percentage of time a signal is of a certain value may be obtained and plotted, for instance, in the manner of Fig. 5. This figure is a typical example of data obtained over a circuit of this nature, in the one case, during the winter and, in the second case, during the summer.

With the message register, such as 58, connected as shown in Fig. 2 the reading of the numerator timer 58 divided by the reading of the denominator timer 59 will give the percentage of time over which the signal was ineffective to operate the relay B. The connection of the message register 58 might just as well have been made to the front contact of relay B. The reading of the numerator timer 58 divided by the denominator 59 will then give the percentage of time over which the signal was strong enough to operate the relay B.

Connected to the front contact of relays B to H, inclusive, are lamps 60 to 66, inclusive. These lamps will give a visual indication of the strength of the signal coming in at any particular time and thus will serve as an instantaneous indicating means.

In Fig. 6 another form of measuring device is shown. This consists essentially of a circuit having input terminal 67 which may be connected to either the point CT or T in Fig. 1. The incoming signals operate the rectifier tube 68 and a voltage is developed across the resistance 69. Various taps taken off this resistance, each lead to a trigger tube, such as 72, and the voltage drop produces a negative potential on the grid of such gas tube 72. If no input is present on the terminals 67, no voltage will appear across the resistance 69 and hence gas tube 72 will be conducting. The anode current of gas tube 72 will then operate the register 73. When this register operates it closes a contact from the front contact of relay 74, the armature and contact of register 73 to condenser 71. Relay 74, in a manner similar to relay 57, is operated by a source of low frequency alternating current, for example, at the rate of five alternations per second. After the register 73 has closed its armature contact then when next the relay 74 applies ground to the lead 70, the condenser 71, which is normally charged by battery connected to common lead 76, will have its charge suddenly changed by the ground connection. This sudden change of potential on the condenser 71 causes the gas tube 72 to be extinguished and the current through the register to cease flowing. However, after a short interval the charge on condenser 71 is equalized and the tube again becomes conductive and register 73 is again operated. Since the extinguishment of tube 72, the release of register 73 and the reoperation of this relay is faster than the pulsing of relay 74, the register 73 will follow the operation of such relay 74.

If a steady input is applied to terminals 67 the direct current potential developed across potentiometer 69 will be sufficient to keep the gas tubes from conducting once they have been extinguished and therefore the register will not operate when the strength of the signal is above the point at which each register, such as 72, 77 and 78, is adjusted to respond. In practice, the tube 72 will be adjusted to cease operation when the signal reaches at least 5 decibels above noise level, the tube 77 will be adjusted to cease operation when the signal reaches the level of 10 decibels above noise level, the tube 78 at 15 decibels above noise level, etc.

If we consider the presence of strong input as normal value of unfaded signal none of the registers will operate but if the potential developed across the potentiometer 69 drops through fading then one or more of the gas tubes will be rendered conductive and a count on the corresponding numerator timers will be made.

This variation has the advantage over the variation shown in Fig. 2 in that if a very rapid decrease in signal strength through fading occurs the gas tube, such as 72, will immediately become conductive and will continue so until extinguished by relay 74. The time for ionization to take place is very short and many times faster than the operate time of the counters, such as 73. Recordings of very short fades are then insured, whereas the relay circuit of Fig. 2 requires the fading to be at least as long as the operate time of the register.

With the aid of measuring devices of this nature, data, such as that shown in the curves of Fig. 5 may be obtained and these data are extremely useful in engineering a system such as that schematically shown in Fig. 1.

What is claimed is:

1. An electrical measuring device for determining the percentage of time a given variable condition is present in an electrical circuit comprising a plurality of numerator timers each for giving a numerator reading indicating the time during which a different degree of said variable condition was present in said circuit over a given denominator time, and a like plurality of circuit closing means for controlling said numerator timers, said means being each differently responsive to said condition.

2. An electrical measuring device for determining the percentage of time a given variable condition is present in an electrical circuit comprising a plurality of numerator timers each for giving a numerator reading indicating the time during which a different degree of said variable condition was present in said circuit over a given denominator time, and a like plurality of marginal relays each constructed and arranged to respond to a different degree of said condition for controlling said numerator timers.

3. An electrical measuring device for determining the percentage of time a given electrical condition is present in an electrical circuit comprising a plurality of numerator timers each for giving a numerator reading indicating the time during which a different degree of said variable condition was present in said circuit over a given denominator time, and a like plurality of gas-filled trigger action tubes for controlling said timers, each said trigger tube being arranged to respond to a different degree of said condition.

4. An electrical measuring device for determining the percentage of time an electrical channel is in condition to deliver a signal of various given strengths, comprising a plurality of numerator timers each for giving a numerator reading indicating the time during which a different strength signal was delivered over a given denominator time, and a like plurality of circuit closing means for controlling said numerator timers, each said means responding to a different strength delivered signal.

5. An electrical measuring device for determining the percentage of time a given variable condition is present in an electrical circuit comprising a plurality of numerator timers each for giving a numerator reading indicating the time during which a different degree of said variable condition was present in said circuit over a given denominator time, a like plurality of circuit closing means for controlling said numerator timers, said means being each differently responsive to said condition, and means for giving a visual indication of which of said circuit closing means are operated at any time.

6. An electrical measuring device for determining the percentage of time a given variable condition is present in an electrical circuit comprising a plurality of numerator timers each for giving a numerator reading indicating the time during which a different degree of said variable condition was present in said circuit over a given denominator time, a like plurality of marginal relays each constructed and arranged to respond to a different degree of said condition for controlling said numerator timers, and signal lamps operated by said relays for giving a visual indication of which relays are operated at any time.

URIAH S. BERGER.